United States Patent [19]

Dean

[11] Patent Number: 4,614,767

[45] Date of Patent: Sep. 30, 1986

[54] MOLDABLE POLYESTER-SULFONE THERMOPLASTIC RESIN

[75] Inventor: Barry D. Dean, Broomall, Pa.

[73] Assignee: Atlantic Richfield Company, Los Angeles, Calif.

[21] Appl. No.: 760,019

[22] Filed: Jul. 29, 1985

[51] Int. Cl.$^4$ .............................................. C08F 8/00
[52] U.S. Cl. ...................................... 525/150; 525/397; 525/437; 528/171; 528/176; 528/193; 528/196; 528/219; 264/331.11; 264/331.15
[58] Field of Search .............. 528/171, 176, 193, 196, 528/219; 525/397, 437, 150; 264/331.11, 331.15

[56] References Cited

U.S. PATENT DOCUMENTS

| | | | |
|---|---|---|---|
| 2,999,849 | 9/1961 | Young et al. | 528/295 |
| 3,004,955 | 10/1961 | Horn | 528/295 |
| 3,035,024 | 5/1962 | Young et al. | 528/293 |
| 4,415,720 | 11/1983 | Rose | 528/171 |

*Primary Examiner*—Melvyn I. Marquis
*Attorney, Agent, or Firm*—Dennis M. Kozak

[57] ABSTRACT

Moldable polyester-sulfone thermoplastic resins are prepared by coreacting a dihydric phenol and a bis($\alpha,\alpha$-disubstituted acetic acid) sulfone or its reactive derivative. In one embodiment the polyester-sulfone resin can be molded to form articles. In another embodiment, the polyester-sulfone resin is blended with an impact-modified styrenic copolymer, polyethylene terephthalate, or polybutylene-terephthalate and the resulting blend is molded to form an article.

23 Claims, No Drawings

MOLDABLE POLYESTER-SULFONE THERMOPLASTIC RESIN

This invention relates to thermoplastic resins.

More specifically this invention relates to moldable polyester-sulfone thermoplastic resins.

In one of its more specific aspects, the invention pertains to moldable polyester-sulfone thermoplastic resins formed by coreacting a dihydric phenol and a bis-(α,α disubstituted acetic acid)sulfone or a reactive derivative thereof and to molded articles produced therefrom.

A number of polymer compositions have been derived from sulfone diesters and diols. U.S. Pat. No. 2,999,849 teaches polymer compositions derived from diarylalkylene monosulfone diesters and alpha, omega alkyl diols. U.S. Pat. No. 3,004,955 teaches polymer compositions derived from diarylalkylene disulfone diesters and alpha, omega alkyl diols. U.S. Pat. No. 3,035,024 teaches polymer compositions derived from dialkylene monosulfone diesters and alpha, omega alkyl diols. Specifically, the dialkylene monosulfone diesters comprise two unsubstituted polymethylene ester groups of between 2 to 10 carbon atoms chemically bonded to the sulfone-modified polyethylene terephthalate derived from a mixture of an alkyl terephthalate monomer, a dialkylene monosulfone diester monomer and ethylene glycol. In this teaching, the dialkylene monosulfone diester comprises two unsubstituted polymethylene ester groups of between 3 to 5 carbon atoms chemically bonded to the sulfone functionality.

This invention provides novel polyester-sulfone thermoplastic resins which exhibit excellent heat and impact resistance and possess fire retardant characteristics.

According to this invention there is provided a moldable thermoplastic resin comprising the reaction product of a dihydric phenol with a bis(α,α-disubstituted acetic acid)sulfone or its reactive derivative, said dihydric phenol having the formula:

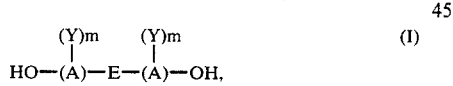

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthaline group m equals 6 and if A is a biphenyline group m equals 8; and said bis(α,α-disubstituted acetic acid)sulfone or its reactive derivative having the formula:

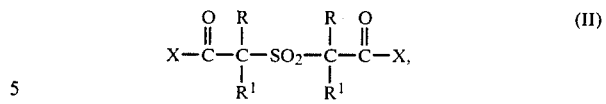

in which each R and R¹ separately represent methyl, ethyl or propyl with the proviso that R and R¹ on the same carbon atom cannot both be propyl; and in which both X's represent hydroxy, methoxy or chlorine.

According to this invention there also is provided a method of producing a molded composition which comprises forming the reaction product of a dihydric phenol and a bis(α,α-disubstituted acetic acid) sulfone or a reactive derivative of a bis(α,α-disubstituted acetic acid)sulfone, said dihydric phenol having the formula:

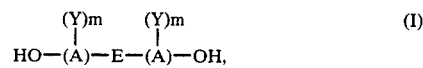

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthaline group m equals 6 and if A is a biphenyline group m equals 8; and said bis(α,α-disubstituted acetic acid)sulfone or its reactive derivative having the formula:

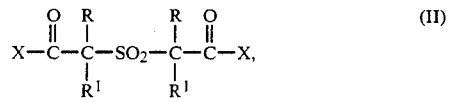

in which each R and R¹ separately represent methyl, ethyl or propyl with the proviso that R and R¹ on the same carbon atom cannot both be propyl; and in which both X's represent hydroxy, methoxy or chlorine and molding the resulting reaction product.

Also, according to this invention there is provided a molded thermoplastic article existing as a single phase in which said single phase is comprised of the reaction product of a dihydric phenol with a bis(, -disubstituted acetic acid)sulfone or its reactive derivative, said dihydric phenol having the formula:

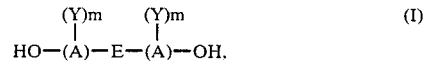

each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a napthaline group m equals 6 and if A is a biphenyline group m equals 8; and said bis($\alpha,\alpha$-disubstituted acetic acid)sulfone or its reactive derivative having the formula:

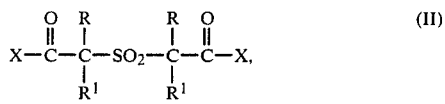

in which each R and $R^1$ separately represent methyl, ethyl or propyl with the proviso that R and $R^1$ on the same carbon atom cannot both be propyl; and in which both X's represent hydroxy, methoxy or chlorine.

Illustrative non-limiting examples of dihydric phenols of formula (I) include: 2,2-bis(4-hydroxyphenyl)propane; 2,2-bis(3,5-dimethyl-4-hydroxyphenyl)propane; 2,2-bis(3,5-dibromo-4-hydroxyphenyl)butane, 2,2-bis(4-hydroxyphenyl)hexafluoropropane, 4,4-isopropylidene-4',4'-dihydroxybiphenyl, 4,4-isopropylidene-4',4'-(2',2'-dichlorodihydroxybiphenyl), 2,2'-isopropylidene-6,7'-dihydroxynaphthalene, and the like, and their mixtures. The most preferred dihydric phenol of general formula (I) is 2,2-bis(4-hydroxyphenyl)propane, also known as bisphenol A.

Illustrative non-limiting examples of the bis($\alpha,\alpha$-disubstituted acetic acid)sulfones of formula (II) include: bis($\alpha,\alpha$-dimethyl acetic acid)sulfone; bis($\alpha,\alpha$-diethyl acetic acid)sulfone; bis($\alpha,\alpha$-methylpropyl acetic acid)sulfone; bis($\alpha,\alpha$-ethylpropyl acetic acid)sulfone; bis($\alpha,\alpha$-ethylmethyl acetic acid)sulfone; and the like, and their mixtures.

Illustrative non-limiting examples of the reactive derivatives of bis($\alpha,\alpha$-disubstituted acetic acid)sulfones of formula (II) include: bis($\alpha,\alpha$-dimethyl acetyl chloride)sulfone; bis($\alpha,\alpha$-diethyl acetyl chloride)sulfone; bis($\alpha,\alpha$-methyl propyl acetyl chloride)sulfone; bis($\alpha,\alpha$-ethylpropyl acetyl chloride)sulfone; bis($\alpha,\alpha$-dimethyl-methylacetate)sulfone; bis($\alpha,\alpha$-diethyl-methyl-acetate)sulfone; bis($\alpha,\alpha$-methylpropyl-methylacetate)sulfone; and the like and their mixtures.

Syntheses for preparing the bis($\alpha,\alpha$-disubstituted acetic acid)sulfones usable in this invention are known. One suitable synthesis is found in Beilstein Organische Chemie Band III, System No. 223, p. 319, and is incorporated herein by reference.

Methods for preparing the novel polyester-sulfone thermoplastic resins from the dihydric phenols and the bis($\alpha,\alpha$-disubstituted acetic acid)sulfones or their reactive derivatives include heterogeneous interfacial polymerization, solution condensation polymerization and melt condensation polymerization. Regardless of which polymerization method is selected, the components will be employed in equimolar or nearly equimolar amounts. The most preferred polymerization method is heterogeneous interfacial polymerization. Interfacial polymerization is suitable for use where the reactants are present in different liquid phases which are immiscible.

If interfacial polymerization is utilized to prepare the novel polyester-sulfone resins of this invention equimolar or nearly equimolar amounts (up to about a 2 mole % excess of one of the reactants) of both components are used. The dihydric phenol is dissolved in a first solvent medium, the bis($\alpha,\alpha$-disubstituted acetic acid)sulfone (such as the acid chloride form) is dissolved in a second solvent medium immiscible with the first, and the two solutions are combined. An alkaline aqueous medium (preferably aqueous NaOH or aqueous KOH) serves as the solvent for the dihydric phenol and an organic solvent is utilized for the sulfone. The organic solvent selected as the solvent for the sulfone must also be capable of dissolving or at least swelling the resulting polyestersulfone resin. Also present during the interfacial polymerization reactions are phase transfer catalysts and molecular weight regulators.

Suitable organic solvents which serve as solvents for the bis($\alpha,\alpha$-disubstituted acetic acid)sulfone and the polyester-sulfone are chlorinated aliphatic solvents (e.g., chloroform, dichloromethane, dichloroethane, trichloroethane and the like, and their mixtures) and chlorinated aromatic solvents (e.g., chlorobenzene). The preferred organic solvent is chloroform.

Suitable phase transfer catalysts are commercially available and include quaternary ammonium compounds and quaternary phosphonium compounds. The preferred phase transfer catalyst is benzyltriethyl ammonium chloride.

The molecular weight regulators serve to control the molecular weight of the polyester-sulfone by a chain stopping or terminating mechanism. Any suitable molecular weight regulator may be used including: phenol, t-butylphenol, o-phenyl phenol and the like, and their mixtures.

The interfacial polymerization reaction proceeds satisfactorily at temperatures within the range of from about 0° to about 40° C., preferably between about 15° to about 35° C. If solution polymerization is utilized the reaction temperatures should also be within the range of from about 0° to about 40° C. With melt phase polymerization the reaction temperatures will be greater than about 250° C. and preferably within the range of from about 250° to about 350° C.

Optionally, the polyester-sulfone thermoplastic resins of this invention can be prepared by substituting 1 to 15 mole% of the bis($\alpha,\alpha$-disubstituted acetic acid)sulfone or its reactive derivative with isophthalic or terephthalic acid or their respective reactive derivatives.

Suitable reactive derivatives of isophthalic or terephthalic acid include: isophthaloyl chloride, terephthaloyl chloride, isophthalic acid, terephthalic acid, dimethyl isophthalate, dimethyl terephthalate, and the like, and their mixtures.

The novel polyester-sulfone thermoplastic resins of the invention can be formed into any desired shape molding, for example, films, sheets, fibers or or molded articles. Specific applications for the polyester-sulfone resins include, but are not limited to, high temperature glazing materials, aircraft canopy and window materials, electrical boxes, high temperature lighting fixtures, automobile bumpers, and the like.

In addition, the polyester-sulfone thermoplastic resins of the invention can be blended with impact-modified styrenic copolymers. Impact modifiers typically include rubbers, thermoplastic elastomers, and the like, and their mixtures. Suitable impact modified styrenic copolymers include impact modified styrene/acrylonitrile (e.g. acrylate/styrene/acrylonitrile), styrene/maleic anhydride, styrene/maleimide, styrene/N-substituted maleimide (e.g. styrene/N-phenylmaleimide), styrene/maleic anhydride/maleimide, styrene/maleic anhydride/N-substituted maleimide (e.g. styrene/maleic anhydride/N-phenylmaleimide), as well as styrene-b-butadiene copolymer and its hydrogenated form; and styrene-b-butadiene-b-styrene polymer and its hydrogenated form. Also suitable for use and included under the phrase impact modified styrenic copolymers as used herein are functionalized hydrogenated styrene-b-butadiene copolymers and styrene-b-butadiene-b styrene polymers. The polymers can be functionalized with any suitable hydrogen bonding monomer(s) such as, for example, maleimide, methacrylic acid, N-parahydroxyphenylmaleimide and the like using conventional methods of preparation. Blends with polyethylene terephthalate, polybutyleneterephethalate, and like polyesters can also be prepared.

The following examples illustrate the preparation and useful properties of the novel polyester-sulfone thermoplastic resins of the invention. Evaluation of material properties was performed based on the following ASTM standard tests: flexural modulus (D-790), tensile strength (D-638), elongation (D-638), notched Izod (D-256); Limiting Oxygen Index (D-2863), and DTUL (deflection temperature under load, $\frac{1}{8}''$ at 264 psi, (D-648). Gardner falling weight index was established using a $1\frac{1}{4}''$ diameter orifice and an 8 pound $\frac{1}{2}''$ diameter weight. Glass transition temperature was determined by differential scanning colorimetry.

EXAMPLE 1

This example demonstrates the preparation of bis(isobutyryl chloride)sulfone.

Isobutyric acid (175 grams) was dissolved in 700 milliliters of anhydrous tetrahydrofuran (THF). The isobutyric acid/THF solution was cooled to about −15° C. To the isobutyric acid/THF solution was added 1.53 liters of 2.6M n-butyllithium/hexane solution. The temperature of the reaction was maintained between −10° C. to −15° C. during the addition of the alkyllithium reagent. After stirring for about one hour at between −10° to −15°, sulfuryl chloride (134 grams) was added dropwise while maintaining the temperature at −15° C. The lithium dicarboxylate sulfone was recovered by metered addition of 1.4 liters of hexane resulting in precipitation of the lithium dicarboxylate sulfone which was isolated by filtration.

The lithium dicarboxylate sulfone was dissolved in water and acidified to pH=1.0 which resulted in precipitation of a fine white powder. The powder exhibited a melting point of 190°–192° C. Elemental analysis and $^{13}C$ NMR were utilized to confirm the structure:

| Elemental Analysis | Calculated | Found |
|---|---|---|
| % C | 40.33 | 40.25 |
| % H | 5.92 | 5.86 |
| % S | 13.46 | 13.42 |
| $^{13}C$ NMR | | |
| $HO-\overset{O}{\overset{\|}{C}}-\overset{CH_3}{\overset{\|}{\underset{\|}{C}}{\underset{CH_3}{}}}-SO_2-\overset{CH_3}{\overset{\|}{\underset{\|}{C}}{\underset{CH_3}{}}}-\overset{O}{\overset{\|}{C}}-OH$ | | |
| $-CH_3$ | 23.1 | |
| $HO-\overset{O}{\overset{\|}{C}}-\underset{=}{C}-SO_2$ | 49.8 | |
| $-\overset{O}{\overset{\|}{C}}-OH$ | 174.6 | |

The dicarboxylic acid sulfone (165 grams) was dissolved in 650 milliliters of dry chloroform. The chloroform/dicarboxylic acid sulfone solution was treated with thionyl cholride (165 grams) at 35° C. for five hours. The residual thionyl chloride and the chloroform solvent were removed under vacuum leaving a waxy solid. Infrared analysis confirmed complete conversion of the carboxylic acid functionality to the acid chloride.

EXAMPLE 2

This example demonstrates the preparation of a polyester-sulfone of the invention.

A 3-liter flask was charged with 700 milliliters of water, 84.3 grams of sodium hydroxide, 14 grams of sodium hydrosulfite and 158.4 grams of 2,2-bis(4-hydroxyphenyl)propane. The aqueous solution was cooled to 15° C. under a nitrogen blanket.

In a separate 2-liter flask, 190.9 grams of the bis(isobutyryl chloride)sulfone (all R's and $R^1$'s=$CH_3$, X=chlorine, formula II) as prepared in Example 1 were dissolved in 700 milliliters of chloroform along with 0.8 gram of orthophenyl phenol.

The chloroform solution was transferred to a pressure equalizing addition funnel attached to the 3-liter flask containing the alkaline bisphenol A solution. Benzyltriethyl ammonium chloride (0.5 gram) was added to the alkaline bisphenol A solution, the agitation rate was set at 800 rpm. The chloroform solution containing the reactive acid chloride monomer was metered in over a 20 minute period while maintaining the temperature at 15° C. Stirring was maintained at 800 rpm for 1.5 hours with the reaction temperature at 20° to 25° C.

The polymer was analyzed and found to contain 7.5% sulfur content which was consistent with the structure.

The glass transition temperature of the polyester-sulfone was found to be 184° C. The intrinsic vicosity of the polyester-sulfone in chloroform at 27.5° C. was 0.92 dl/g.

The physical properties of the polyester-sulfone were measured on injection molded test specimens and are summarized in Table I.

TABLE I

| Property | Property Value |
|---|---|
| Tensile strength (psi) | 10,400 |
| Flexural strength (psi) | 13,570 |
| Flexural modulus (psi) | 362,800 |
| Elongation (%) | 79 |
| Tensile impact (ft-lbs/in$^2$) | 326 |
| Notched Izod (ft-lbs/in) | 8.6 |
| Gardner Falling Weight Index (in-lbs) | 480+ |
| DTUL ($\frac{1}{8}''$, °F.) | 308 |
| Vicat (°C.) | 182.5 |
| Limiting Oxygen Index (%) | 27–28 |
| UL 94 Flammability* | V-1 |

TABLE I-continued

| Property | Property Value |
|---|---|
| Rating at 1/8" | |

*American National Standard ANSI/UL 94-1979

EXAMPLE 3

This example demonstrates the preparation of a novel polyester-sulfone of the invention in which 9 mole % of the bis(isobutyryl chloride) sulfone has been substituted with isophthaloyl chloride.

A 3-liter flask was charged with 700 milliliters of water, 84.3 grams of sodium hydroxide, 14 grams of sodium hydrosulfite and 158.4 grams 2,2-bis(4-hydroxyphenyl)propane. The aqueous solution was cooled to 15° C. under a nitrogen blanket.

In a separate 2-liter flask, 173.5 grams of the bis(isobutyryl chloride)sulfone as prepared in Example 1 and 72.5 grams of isophthaloyl chloride were dissolved in 700 milliliters of chloroform along with 0.8 gram of orthophenyl phenol.

The chloroform solution was transferred to a pressure equalizing addition funnel attached to the 3-liter flask containing the alkaline bisphenol A solution. Benzyltriethyl ammonium chloride (0.5 gram) was added to the alkaline bisphenol A solution, the agitation rate was set at 800 rpm. The chloroform solution containing the reactive acid chloride monomers was metered in over a 20 minute period while maintaining the temperature at 15° C. Stirring was maintained at 800 rpm for 1.5 hours with the reaction temperature at 20° to 25° C.

The polymer formed was recovered by precipitation of the chloroform layer into methanol.

The polymer was analyzed and found to contain 7.0% sulfur content which was consistent with the structure.

The glass transition temperature of the polyestersulfone was found to be 186.5° C. The intrinsic viscosity in chloroform at 27.5° C. was 0.91 dl/g.

EXAMPLE 4

This example demonstrates the preparation of a polyester-sulfone of the invention in which 9 mole % of the bis(isobutyryl chloride)sulfone has been substituted with terephthaloyl chloride.

The method of Example 3 was followed except terephthaloyl chloride was substituted for isophthaloyl chloride.

The polymer was analyzed and found to contain 6.9% sulfur content which was consistent with the structure.

The glass transition temperature of the polyester-sulfone was found to be 188° C. The intrinsic viscosity in chloroform at 27.5° C. was 0.83 dl/g.

EXAMPLE 5

This example demonstrates a polyblend of this invention containing a polyester-sulfone of the invention and a rubber-modified styrene/maleic anhydride copolymer.

Approximately 600 grams of the polyester-sulfone (Example 2) and 400 grams of DYLARK ® 350 resin (ARCO Chemical Company, division of Atlantic Richfield Company) were melt mixed in an extruder (550° F.) and converted into pellets. Test specimens for evaluation of physical properties were then prepared via injection molding (560° F.). The resulting physical properties of the 60/40 polyblend are given in Table II (below).

TABLE II

| Property | Property Value |
|---|---|
| Tensile strength (psi) | 7,150 |
| Flexural strength (psi) | 12,000 |
| Flexural modulus (psi) | 339,600 |
| Elongation (%) | 51 |
| Notched Izod (ft-lbs/in) | 4.1 |
| Gardner Falling Weight Index (in-lbs) | 440 |
| DTUL (1/8", °F.) | 252 |

EXAMPLE 6

This example demonstrates another polyblend of this invention containing a polyester-sulfone of the invention and a rubber modified styrene/acrylonitrile copolymer.

Approximately 600 grams of the polyester-sulfone (Example 2) and 400 grams of a rubber-modified styrene/acrylonitrile designated Luran ® S ASA (acrylate-styrene-acrylonitrile) resin (Grade 776 S/SE Badische Corporation, Williamsburg, Va. were melt mixed in an extruder (540° F.) and converted into pellets. Test specimens for evaluation of physical properties were then prepared via injection molding (540° F.). The resulting physical properties of the 60/40 polyblend are given in Table III (below).

TABLE III

| Property | Property Value |
|---|---|
| Tensile strength (psi) | 9,044 |
| Flexural strength (psi) | 12,670 |
| Flexural modulus (psi) | 343,050 |
| Elongation (%) | 89 |
| Notched Izod (ft-lbs/in) | 14.4 |
| Gardner Falling Weight Index (in-lbs) | 480+ |
| DTUL (1/8", °F.) | 245 |

EXAMPLE 7

This example demonstrates another polyblend containing a polyester-sulfone of the invention and a rubber-modified styrene/N-phenylmaleimide copolymer.

Approximately 600 grams of the polyester-sulfone (Example 2) and 400 grams of a styrene/N-phenylmaleimide copolymer (70/30 wt%) grafted to EPDM rubber were melt mixed in an extruder (580° F.) and converted into pellets. Test specimens for evaluation of physical properties were then prepared via injection molding (580° F.). The resulting physical properties of the 60/40 polyblend are given in Table IV (below).

TABLE IV

| Property | Property Value |
|---|---|
| Tensile strength (psi) | 8,170 |
| Flexural strength (psi) | 12,800 |
| Flexural modulus (psi) | 347,600 |
| Elongation (%) | 60 |
| Notched Izod (ft-lbs/in) | 6.1 |
| Gardner Falling Weight Index (in-lbs) | 480 |
| DTUL (1/8", °F.) | 282 |

EXAMPLE 8

This example serves to demonstrate enhanced impact modification of the polyester-sulfone resin of this invention achieved by blending to incorporate a functionalized hydrogenated polystyrene-poly(ethylene-co-1-butene)polystyrene triblock polymer which has been modified with maleimide.

Approximately 895 grams of the polyester-sulfone (Example 2) and 47 grams of Kraton ® G1650 thermoplastic elastomer modified so as to have 11.1% maleimide monomer grafted on the thermoplastic elastomer backbone were melt mixed in an extruder (570° F.) and converted into pellets. Test specimens for evaluation of physical properties were then prepared via injection molding (580° F.). The resulting physical properties of the polyblend are given in Table V (below).

TABLE V

|  | A | B | C |
|---|---|---|---|
| Composition |  |  |  |
| Polyester-Sulfone (Example 2) | 100 | 95 | 95 |
| Kraton ® G1650 TPE | — | 5 | — |
| Kraton ® G1650 TPE Modified with maleimide | — | — | 5 |
| Property |  |  |  |
| Tensile strength (psi) | 10,400 | 9,650 | 9,960 |
| Flexural modulus (psi) | 362,800 | 357,600 | 358,700 |
| Elongation (%) | 79 | 74 | 97 |
| Notched Izod (ft-lbs/in) | 8.6 | 8.4 | No break |
| Gardner Falling Weight Index (in-lbs) | 480+ | 400+ | 480+ |
| DTUL (⅛", °F.) | 308 | 307 | 309 |

It will be evident from the foregoing that various modifications can be made to this invention. Such, however, are considered as being within the scope of the invention.

What is claimed is:

1. A moldable thermoplastic resin comprising the reaction product of a dihydric phenol with a bis(α,α-disubstituted acetic acid)sulfone or its reactive derivative, said dihyrdic phenol having the formula:

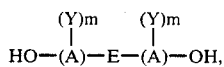

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenyline group m equals 8; and said bis(α,α-disubstituted acetic acid)sulfone or its reactive derivative having the formula:

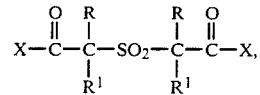

in which each R and $R^1$ separately represent methyl, ethyl or propyl with the proviso that R and $R^1$ on the same carbon atom cannot both be propyl and in which both X's represent hydroxy, methoxy or chlorine.

2. The moldable thermoplastic resin of claim 1 in which said dihyric phenol is 2,2 bis(4-hydroxylphenyl)propane.

3. The moldable thermoplastic resin of claim 1 in which the reactants are employed in equimolar or nearly equimolar amounts.

4. The moldable thermoplastic resin of claim 1 comprising from about 1 to about 15 mole % of a monomer selected from the group consisting of isophthalic acid, terephthalic acid and their reactive derivatives, said monomer being substituted for an equal amount of said bis(α,α-disubstituted acetic acid)sulfone or its reactive derivative.

5. A polyblend comprising the moldable thermoplastic resin of claim 1 and an impact-modified styrenic copolymer.

6. A polyblend comprising the moldable thermoplastic resin of claim 1 and polyethylene terephthalate.

7. A polyblend comprising the moldable thermoplastic resin of claim 1 and a polybutylene terephthalate.

8. The moldable thermoplastic resin of claim 1 prepared by heterogeneous interfacial polymerization.

9. The moldable thermoplastic resin of claim 1 prepared by solution condensation polymerization.

10. The moldable thermoplastic resin of claim 1 prepared by melt condensation polymerization.

11. A method of producing a molded composition which comprises forming the reaction product of a dihydric phenol and a bis(α,α-disubstituted acetic acid)sulfone or its reactive derivative, said dihydric phenol having the formula:

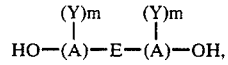

in which each A separately represents a phenylene group, a napthalene group or a biphenylene group; E represents an alkylene group; an alkylidene group; hexafluoroisopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is a biphenyline group m equals 8; and said bis(α,α-disubstituted acetic acid)sulfone or its reactive derivative having the formula:

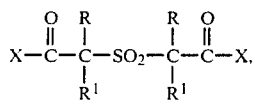

in which each R and R¹ separately represent methyl, ethyl or propyl with the proviso that R and R¹ on the same carbon atom cannot both be propyl and in which both X's represent hydroxy, methoxy or chlorine; and, molding the resulting reaction product.

12. The method of claim 11 in which said dihydric phenol is 2,2 bis(4-hydroxyphenyl)propane.

13. The method of claim 11 in which the reaction to form the reaction product is carried out in the presence of from about 1 to about 15 mole % of a monomer selected from the group consisting of isophthalic acid, terephthalic acid and their reactive derivatives, said monomer being substituted for an equal amount of said bis(α,α-disubstituted acetic acid)sulfone or its reactive derivative.

14. The method of claim 11 in which said reaction product is prepared by heterogeneous interfacial polymerization.

15. The method of claim 11 in which said reaction product is prepared by solution condensation polymerization.

16. The method of claim 11 in which said reaction product is prepared by melt condensation polymerization.

17. A method of producing a molded polyblend which comprises blending the moldable thermoplastic resin of claim 1 with an impact-modified styrenic copolymer and molding the resulting polyblend.

18. A method of producing a molded polyblend which comprises blending the moldable thermoplastic resin of claim 1 with polyethylene terephthalate and molding the resulting polyblend.

19. A method of producing a molded polyblend which comprises blending the moldable thermoplastic resin of claim 1 with polybutylene terephthalate and molding the resulting polyblend.

20. A molded thermoplastic article existing as a single phase in which said single phase is comprised of the reaction product of a dihydric phenol with a bis(α,α-disubstituted acetic acid)sulfone or its reactive derivative, said dihydric phenol having the formula:

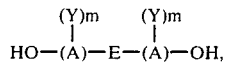

in which each A separately represents a phenylene group, a naphthalene group or a biphenylene group; E represents an alkylene group; an alkylidene group; hexafluoroiosopropylidene; two or more alkylene groups connected by a group other than an alkylene or an alkylidene group; two or more alkylidene groups connected by a group other than an alkylene or an alkylidene group; a cycloaliphatic group; two or more cycloaliphatic groups connected by a group other than an alkylene, an alkylidene or a cycloaliphatic group; or a cycloalkylidene group; each Y separately represents fluorine, chlorine, bromine, hydrogen, a monovalent hydrocarbon group or an oxy group; and wherein if A is a phenylene group m equals 4, if A is a naphthalene group m equals 6 and if A is biphenyline group m equals 8; and said bis(α,α-disubstituted acetic acid)sulfone or its reactive derivative having the formula:

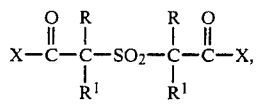

in which each R and R¹ separately represent methyl, ethyl or propyl with the proviso that R and R¹ on the same carbon atom cannot both be propyl and in which both X's represent hydroxy, methoxy or chlorine.

21. A molded polyblend produced according to the method of claim 17.

22. A molded polyblend produced according to the method of claim 18.

23. A molded polyblend produced according to the method of claim 19.

* * * * *